(12) United States Patent
McDonald

(10) Patent No.: US 7,008,064 B2
(45) Date of Patent: Mar. 7, 2006

(54) TWO PANEL OPTICAL ENGINE FOR PROJECTION APPLICATIONS

(75) Inventor: David Charles McDonald, Longmont, CO (US)

(73) Assignee: eLCOS Microdisplay Technology, Inc., Sunnyvale, CA (US)

( * ) Notice: Subject to any disclaimer, the term of this patent is extended or adjusted under 35 U.S.C. 154(b) by 0 days.

(21) Appl. No.: 10/700,643

(22) Filed: Nov. 3, 2003

(65) Prior Publication Data

US 2004/0150889 A1 Aug. 5, 2004

Related U.S. Application Data

(60) Provisional application No. 60/424,213, filed on Nov. 5, 2002.

(51) Int. Cl.
G03B 21/14 (2006.01)
G03B 21/00 (2006.01)
G02B 5/22 (2006.01)
(52) U.S. Cl. .............................. 353/84; 353/20; 353/31; 359/891
(58) Field of Classification Search .................. 353/30, 353/31, 33, 34, 81, 84, 94, 97, 20, 122; 349/5, 349/8, 9; 359/490, 496, 501, 502, 887, 890–892
See application file for complete search history.

(56) References Cited

U.S. PATENT DOCUMENTS

| 4,500,172 | A | | 2/1985 | Gagnon et al. | |
|---|---|---|---|---|---|
| 5,517,340 | A | * | 5/1996 | Doany et al. | 349/5 |
| 5,921,650 | A | * | 7/1999 | Doany et al. | 353/31 |
| 6,309,071 | B1 | * | 10/2001 | Huang et al. | 353/31 |
| 6,402,323 | B1 | * | 6/2002 | Shiue et al. | 353/20 |
| 6,568,815 | B1 | * | 5/2003 | Yano | 353/84 |
| 6,773,111 | B1 | * | 8/2004 | Yamamoto | 353/20 |

FOREIGN PATENT DOCUMENTS

WO   PCT/US00/13063   8/2000

\* cited by examiner

*Primary Examiner*—W. B. Perkey
*Assistant Examiner*—Andrew Sever
(74) *Attorney, Agent, or Firm*—Bo-In Lin

(57) ABSTRACT

Optical engines using a reduced number of components offer advantages over more complex optical systems. Three panel optical engines have offered the advantage of relatively high throughput but at the cost of complexity and increased components on the bill of materials. Conventional two-panel engines have required the use of complex retarder structures to achieve the dual polarizations state for the three primary colors. The present invention achieves this goal while using simpler optical retarders.

19 Claims, 2 Drawing Sheets

TWO PANEL OPTICAL ENGINE FOR PROJECTION APPLICATIONS

This Application is a Formal Application and claim a Priority Date of Nov. 5, 2002 benefited from a Provisional Patent Application 60/424,213 file by one common inventor of this Patent Application.

BACKGROUND OF THE INVENTION

1. Field of the Invention

The present invention pertains to liquid crystal display (LCD) systems, and more particularly to improved two panel optical engines using simpler optical retarder for color display projection.

2. Description of the Prior Art

As earlier research projects in developing microdisplay systems using the liquid crystal display technologies were mostly for military and specialized applications with high performance requirements, the systems were generally configured without much concern for production costs. However, some of the configurations as developed earlier now become quite costly when the microdisplay systems are commercialized for high definition TVs and used as monitor for computers. One particular system is the simplified two panels display configurations while cost savings are achieved with two instead of three color display panels, the optical components used for color path separation and polarization modifications as disclosed by the conventional configurations are specially made thus unduly increases the production cost of such systems.

It is well known that the complexity of on-axis optical engines has hindered the development of cost-effective liquid crystal on silicon display devices for projection applications. The earliest developments were based on earlier reflective light valve efforts that were manufactured to high levels of performance at great cost for industrial and military uses. The more recent approaches have been for application in commercial display products such as data monitors and television receiving sets. While much of the earlier work remains relevant to background, improved solutions of lower cost have been sought.

The earliest attempts to solve this problem have required compromises. For example, in U.S. Pat. No. 4,500,172, a two-panel reflective display architecture is disclosed that is limited to modulated light of two primary colors displayed on a constant background of the third primary color. Two beams of polarized colored light, said two beams of light having different spectra, are directed onto one surface of a polarizing beamsplitter. The two reflective displays are arrayed on two remaining faces of the polarizing beamsplitter. The fourth port of the polarizing beamsplitter delivers the combined beams to a lens group for projection onto a viewing screen.

Later, Sharp et al disclose in PCT Application WO 00/7-376 a two-panel architecture requiring the use of color selective retarder stacks that separate linearly polarized light into orthogonal polarized beams of light based on the spectrum of the light. The orthogonally polarized beams of light are then separated by a polarizing beamsplitter (PBS) and directed onto the faces of two different microdisplays for image generation. The optical architecture therein is efficient and practical, but suffers in application because of the high cost and limited supply of the color selective retarder stacks.

For these reasons, there is still need and challenge in the art of microdisplay such as a two-panel liquid crystal on silicon (LCOS) display to provide improved system architecture and methods for polarization and color separation.

SUMMARY OF THE PRESENT INVENTION

It is therefore an object of the present invention to provide new and simplified means to process color path separation through polarization modifications and then recombination to achieve flexibly manageable color intensity adjustments dependent upon the background color of particular light source. The new and simplified color path separation and polarization modifications employ dichroic trim filters and optical retarder that are commercially available and of low cost while achieve high quality color display effect such that the aforementioned difficulties and limitations can be overcome.

The present invention is a reduced-cost two-panel projection engine optical architecture suitable for use as a data monitor, television display device, or front projection system for application at home or business locations. The invention makes use of convention materials throughout for reduced cost and good performance.

Briefly, in a preferred embodiment of the present invention, this invention discloses an optical subsystem to separate color paths of a color-composite light that includes a dichroic device to separate the color-composite light into a first color path and a second color path. The optical subsystem further includes an optical retarder to modify a polarization state for one of the first and second color paths whereby the lights of transmitted over the first and second light path may be recombined and processed by a polarization beam splitter (PBS). In a preferred embodiment, the optical retarder further comprising a half-wave retarder to modify a ninety-degrees polarization state between light beams transmitted along the first and second color paths. In another preferred embodiment, the optical subsystem further includes a color combiner for receiving light beams transmitted along the first and a second color paths to reconstitute a combined beam of light comprising two different colors with mutually orthogonal polarization states. In another preferred embodiment, the optical subsystem further includes a polarizing beam splitter (PBS) for receiving and splitting the combined beam according to a polarization state for projecting to two microdisplay panels. In a specific embodiment, the dichroic device further separating the composite light into a red path and a green-or-blue path. In another specific preferred embodiment, the optical subsystem further includes a linear polarizer disposed right after the optical retarder in one of the first and second color paths.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENT

Figure 2:
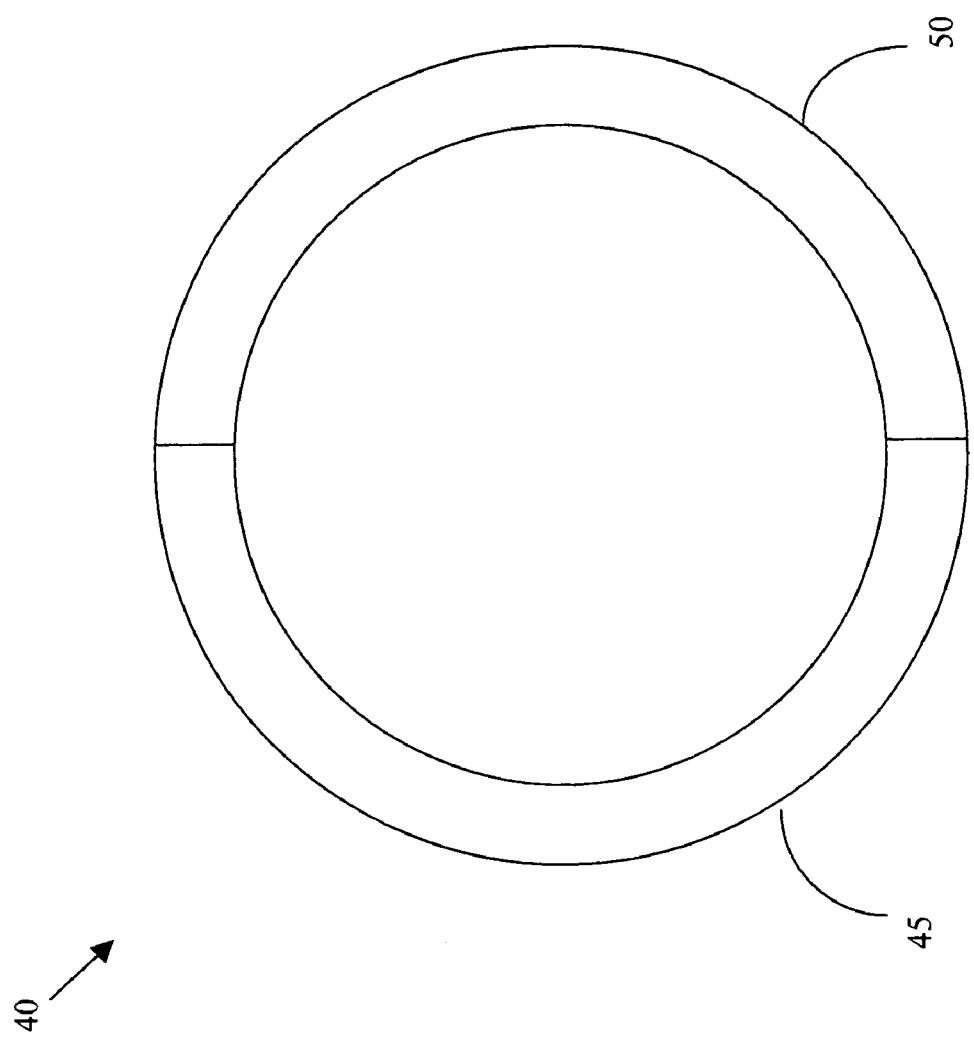

Referring to FIG. 2 for a two-panel engine 100 of this invention. The two panel optical engine 100 as shown in FIG. 2 can be divided into three major subsections. These three subsections are 1) an illumination subsection 101 for providing illumination for the optical engine; 2) a color generation, polarization and color separating subsection 102 that includes a means for separating different colors into orthogonal polarization states, and imaging and 3) a projection subsection 103 that includes means for generating composite color images.

In the illumination subsection 101, a high intensity discharge (HID) lamp or other suitable illumination generating system generates an illumination beam of light 55. A reflector, integrating sphere, or other suitable means is used to focus the light from the HID lamp. Since the specific details of the means for focusing the light beam is not part of the invention, for the sake of clarity, these details are not further provided. The illumination beam of light 55 may be unpolarized, linearly polarized or circularly polarized.

The beam of light 55 is directed through color wheel 60. As is well known in the art, color wheel are used to separate light into color temporally. The duration of each color is determined by the rotation rate and diameter of the color wheel at the point of illumination, and by the length of the different color segments. FIG. 2, described later, presents one embodiment of the color wheel. For the present example it is assumed that the segments of the color wheel alternatively pass first red and green light (hereafter referred to as yellow) and then red and blue light (hereafter referred to as magenta.) Thus exiting beam of light 65 is alternatively color yellow and magenta. The beam of light 65 then passes through optical component 70. Optical component 70 may perform a number of different functions by receiving the light from the color wheel and modify it to a beam as that required by the remainder of the system. The optical component 70 may also include other elements such as a polarization conversion system (PCS) to take incident unpolarized light 65 and convert it to substantially polarized light 75. The light then passes from subsection 101 to subsection 102 for subsequent functions of separation by spectrum and polarization.

The first function of subsection 102 is to polarize the incident light 75 more thoroughly. It is the nature of PCS units as implemented in the optical component 70 that the resultant light 75 may contain up to 10% or 15% of light that is incorrectly polarized. To convert this to polarized light with fewer incorrectly polarized components, a polarizing element 80 is included. While element 80 may be considered optional to the design, the performance without it would normally be of unacceptably low contrast, as is well known. The vertical arrows 85 depicts that the output beam 90 from the polarizing element 80 is a p-polarized light. For the convenience of illustration, this convention will be employed through the remaining descriptions of this invention.

Depending on the time sequencing of the color wheel, the incident p-polarized beam of light 90 alternates as a light beam that comprises the red and blue primary colors or the red and green primary colors. When beam of light 90 passes through a dichroic trim filter 140, the resultant light is separated into p-polarized red beam of light 155 and p-polarized green or blue beam of light 145. The dichroic trim filter 140 trims blue and green light and passes red light. The passed beam of light 155 reflects from mirror 150 and projected to color combiner 170. The mirror 150 is preferably a first surface mirror although other types of mirrors, such as dielectric mirrors, may also serve the purpose. The color combiner 170 is a red trim filter that passes blue and green light and reflects red light and is based solely on spectrum. The spectral characteristics of the color combiner 170 may be mismatched to that of the color separator 140 to create a notch between red and green, should that be needed to eliminate objectionable features typical of high pressure mercury lamps, such as the yellow spike at 578 nanometers wavelength.

The p-polarized beam of light 145 passes from the color separator 140 and is reflected by a mirror 160 and then projected to a retarder device 130. The mirror 160 is, as is the case for mirror 150, preferably a first surface mirror but alternatively may be a dielectric or other mirror. The retarder device 130 is a half wave retarder and is arranged to have a particular orientation such that p-polarized light entering the retarder exits as s-polarized light. Because the retarder must be able to rotate the polarizations of both green light and blue light, an achromatic retarder may be preferred. Such retarder designs are now quite common and are therefore not further described. The orientation of the first optical axis of retarder device 130 may be aligned at 45 degrees to the orientation of the incident p-polarized beam 145 as this would normally result in an exiting beam of light with plane of polarization rotated by 90 degrees to the plane of polarization of the incident light. For the convenience of illustration and description, hereafter this light 165 will be referred to as s-polarized light. The polarizing element 135 is optionally placed adjacent to and after retarder element 130 to clean up the exiting polarization of the retarder element and insure that no element of the incident light emerges with the incorrect polarization. The S-polarized beam of light 165 emerges from retarder element 130 and from optional polarizing element 135 and projects to color combiner 170. At this point color combiner 170 merges the s-polarized blue or green beam of light 165 with p-polarized red beam of light 155 to form a composite beam of light 205, where the beam of light 205 comprises light of two different spectra where the two different spectra are of orthogonal polarization states. The beam of light 205 then exits subsection 102 and enters into subsection 103.

As the beam of light 205, now comprises p-polarized red light and s-polarized blue or green light, enters into a polarizing beamsplitter 210, the beamsplitter divides beam 205 into p-polarized red beam of light 232 and s-polarized green or blue beam of light 222 and then directs those beams to different ports on the polarizing beamsplitter.

The p-polarized red beam of light passes through PBS 210 to project to a reflecting microdisplay 230. The reflecting microdisplay 230 is constructed such that it is optimized to reflect red light. Optionally the design may include a quarter wave retarder element 235 disposed between polarizing beam splitter 210 and reflective microdisplay 230. Use of a quarter wave retarder is highly recommended when the polarizing beam splitter is a traditional glass device of the MacNeille type. In an alternate embodiment, the quarter wave retarder 235 may not be necessary when the polarizing beam splitter is a wire grid polarizer of the type now commercially available by Moxtek Corporation of Orem, Utah. The advisability of a quarter wave retarder in such applications is fully disclosed and clearly explained by Rosenbluth et al in their paper "Contrast Properties of Reflective Liquid Crystal Light Valves in Projection Displays," published in the IBM Journal of Research and Development, Vol. 42, No. 3/4, dated July 1998, the disclosures made in the publication are hereby incorporated by reference in the present Patent Application. The polarized beam of light 232 incident upon reflecting microdisplay 230 has its polarization state modified in some respect by the state of the liquid crystal material within microdisplay 230. The device physics of this rotation according to the designs of the display dictates the degree and type of modifications and that is a way by which information is encoded by the microdisplay into the beam of light. Reflected beam of light 233 now consists of a number of differing time-variant polarization states based on the continuing drive state of reflective microdisplay 230. Reflected beam of light 233 enters polarizing beamsplitter 210, where the s-polarized components of said beam of light are reflected to form part of composite beam of light 245. Thus the polarization states encoded in beam of light 233 are converted into intensity variations within beam of light 245.

Likewise the s-polarized beam of light 222 is directed by the polarizing beamsplitter 210 to a reflective microdisplay 220. As previously mentioned, the s-polarized beam of light 222 is alternatively green or blue and the alternations of colors depending on the time sequence of color wheel 60 described earlier. The beam of light 222 may pass through a quarter wave retarder 225 for transmitting to the reflective microdisplay 220. Again, the quarter wave retarder 225 is optional and depends on the types of PBS 210 implemented in the optical engine as described above. It may be necessary to implement the quarter wave retarder 225 as an achromatic retarder having a retarding wavelength across the green and blue spectrum because of the need to perform its function across a somewhat wider spectrum of light than is required of quarter wave retarder 235. The reflected beam of light 223 is returned to polarizing beam splitter 210. The beam of light 223 comprises a number of time-variant polarization states, and the polarization states depending solely on the drive state of the liquid crystal array in reflecting microdisplay 220. As beam of light 223 passes through polarizing beamsplitter 210, the p-polarized components of beam of light 223 are separated by the PBS 210 to form part of composite beam of light 245. Thus the polarization states encoded on beam of light 223 are converted into intensity variation within composite beam of light 245.

As a design option, a color polarizer 250 is disposed between polarizing beamsplitter 210 and projection lens 250. This filter may be relocated to other positions within the projection path, but the described position is preferred so that plastic lenses and the like may be used in the projection lens design without concern for the ultimate quality of the image. Because composite beam of light 245 includes s-polarized red light and because said s-polarized red light is analyzed by polarizing beamsplitter 210 in reflection, it is possible that there may be some first surface reflections of red light within the composite beam that are of the orthogonal polarization. Failure to remove these components may result in a final image with lower contrast in the red color than is desirable. The function of optional red polarizer 250 is to remove said unwanted components without disturbing the blue or green p-polarized light components. Such polarizers are well known in the art. It would be acceptable for the polarizing function of the red polarizer to start at wavelengths as low as approximately 560 nanometers so as to insure that the polarizer is full polarizing up to a wavelength around 610 nanometers. This may attenuate a slight amount of the green light, but the bulk of the luminance of green light in high-pressure mercury lamps is located in a spike at 550 nanometers. Invariably projection systems built using such lamps must severely attenuate green light to achieve proper color balance.

Based on the foregoing, composite beam of light 255 emerges from optional red polarizer 250 and enters projection lens 260. The composite beam of light 255 is identical to composite beam of light 245 if optional red polarizer 250 is removed. The projection lens 260 modifies beam of light 255 by magnification and focus and results in a new composite beam of light 270 that is delivered to the view screen.

FIG. 2 shows a preferred embodiment of the color wheel for this invention. The color wheel 60 as that depicted in FIG. 1 includes a set of dichroic filter segments 40 arrayed circumferentially around the hub of the wheel. These dichroic elements may consist of two or more segments, the length of the segments varying according to the specific color requirements of the design. In the specific example of FIG. 2, dichroic color filter 45 may be yellow, in that it passes both red and green and reflects blue, and dichroic color filter 50 may be magenta, in that it passes both red and blue and reflects green. Thus as the color wheel rotates, the spectrum of the light passing through the dichroic segments alternates between two states. In alternative embodiments, different color segments may be used. For example, it may be preferred to reduce noise by lowering the rotation rate. The color field rate may be maintained by increasing the number of color segments.

Numerous alternatives to the choices described above may be made without exceeding the bounds of the present invention. For example, it may be desirable to make blue the color that is always on and reduce the time available for red. In that case, a different dichroic configuration may direct blue to one microdisplay and red and green alternatively to the other. These alternatives will be obvious to those skilled in the art.

Figure 1:
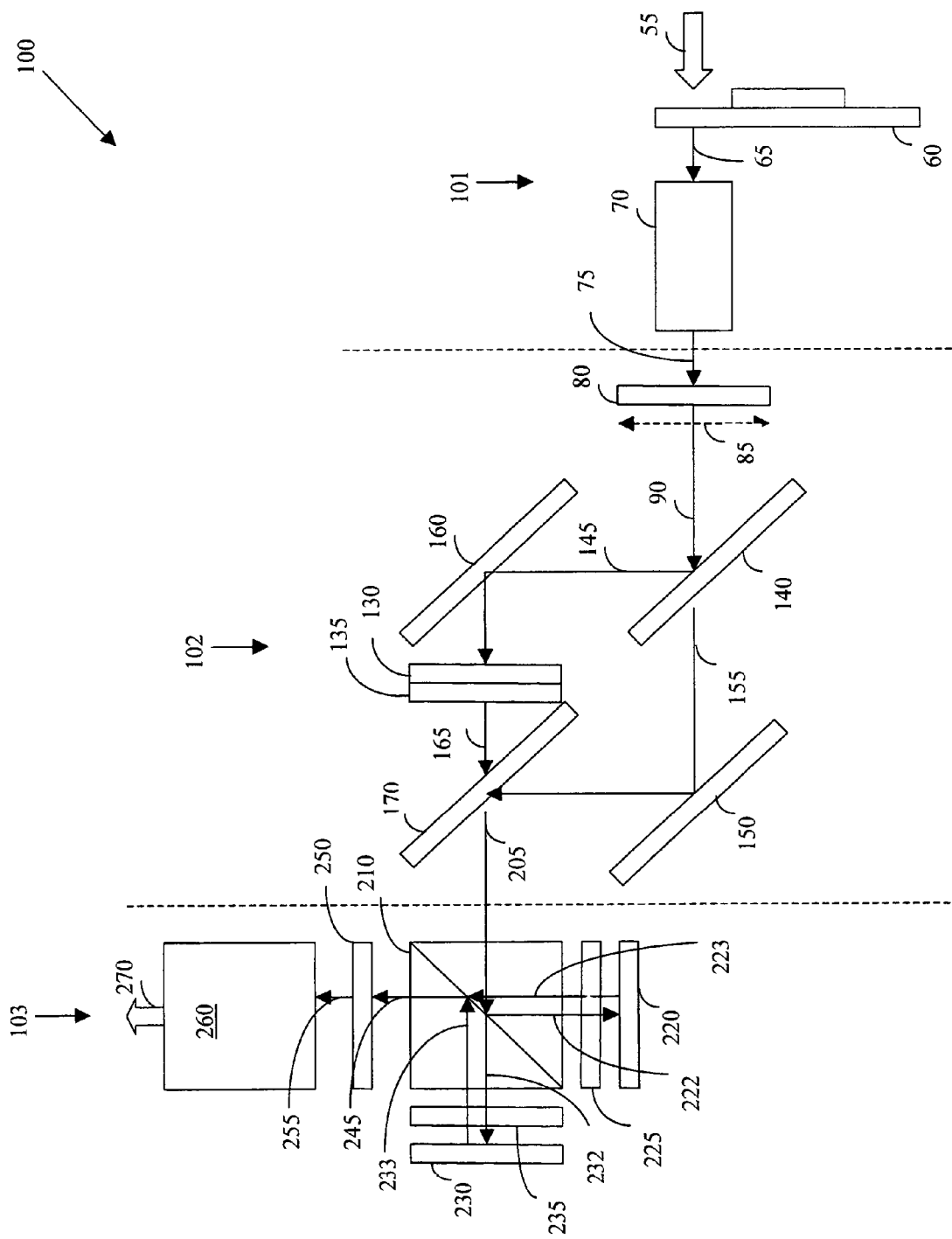
FIG. 1 depicts the present invention of a two-panel liquid crystal on silicon display device, and FIG. 2 depicted a dichroic color wheel the forms part of the present invention.

According to FIGS. 1 and 2 and above descriptions, this invention discloses an optical engine that includes a color wheel to alternatively derive at least two separate composite lights. The optical engine further includes a dichroic device to sequentially separate the at least two composite lights into a first color path and a second color path and an optical retarder to modify a polarization state for one of the first and second color paths. The optical engine further includes a color combiner for receiving a first beam and a second beam of light projected from the first and second light path respectively to reconstitute a combined beam of light comprising two different colors with mutually orthogonal polarization states. In a preferred embodiment, the optical engine further includes a polarizing beam splitter (PBS) for receiving and splitting the combined beam according to a polarization state for projecting to two microdisplay panels. In a preferred embodiment, the color wheel further drives two composite lights comprising a yellow light and a magenta light. In a preferred embodiment, the dichroic device separating the composite lights into a red path and a green-or-blue path. In a preferred embodiment, the optical engine further includes a projection lens to receive and project light from the polarizing beamsplitter. In a preferred embodiment, the optical retarder to modify a polarization state for one of the first and second color paths further comprising a half-wave optical retarder for changing a polarization by ninety degrees. In a preferred embodiment, the optical engine further includes a linear polarizer disposed right after the optical retarder in one of the first and second color paths. In a preferred embodiment, the optical engine further includes a linear polarizer disposed between the polarization beam splitter and the projection lens for preventing a transmission of selected beam of specific color and specific polarization. In a preferred embodiment, the optical engine further includes a linear polarizer disposed between the polarization beam splitter and the projection lens for preventing a transmission of a red color beam of a p-polarization. In a preferred embodiment, the optical engine further includes a quarter wave plate retarder disposed between at least one of the microdisplay panels and the polarizing beam splitter (PBS).

In essence this invention further discloses a method to configure an optical subsystem to separate color paths of a color-composite light that includes steps of disposing a dichroic device to separate the color-composite light into a first color path and a second color path and employing an optical retarder to modify a polarization state for one of the first and second color paths whereby the lights of transmitted over the first and second light path may be recombined and processed by a polarization beam splitter (PBS). In a preferred embodiment, the step of employing the optical retarder further comprises a step of employing a half-wave retarder to modify a ninety-degrees polarization state between light beams transmitted along the first and second color paths. In a specific embodiment, the method further includes a step of employing a color combiner for receiving light beams transmitted along the first and a second color paths to reconstitute a combined beam of light comprising two different colors with mutually orthogonal polarization states. In another embodiment, the method further includes a step of employing a polarizing beam splitter (PBS) for receiving and splitting the combined beam according to a polarization state for projecting to two microdisplay panels. In another preferred embodiment, the step of separating the composite light with the dichroic device further comprising separating the composite light into a red path and a green-or-blue path. In another preferred embodiment, the method further includes a step of disposing a linear polarizer right after the optical retarder in one of the first and second color paths Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An optical engine comprising:
   a color wheel to alternatively derive at least two separate composite lights;
   a dichroic device to sequentially separate said at least two composite lights into a first color path and a second color path;
   an optical retarder to modify a polarization state for one of said first and second color paths; and
   a color combiner for receiving a first and a second beams of light projected from said first and second light path respectively to reconstitute a combined beam of light comprising two different colors with mutually orthogonal polarization states.

2. The optical engine of claim 1 further comprising:
   a polarizing beam splitter (PBS) for receiving and splitting said combined beam according to a polarization state for projecting to two microdisplay panels.

3. The optical engine of claim 2 further comprising:
   a projection lens to receive and project light from the polarizing beamsplitter.

4. The optical engine of claim 3 further comprising:
   a linear polarizer disposed between said polarization beam splitter and said projection lens for preventing a transmission of selected beam of specific color and specific polarization.

5. The optical engine of claim 3 further comprising:
   a linear polarizer disposed between said polarization beam splitter and said projection lens for preventing a transmission of a red color beam of a p-polarization.

6. The optical engine of claim 2 further comprising:
   a quarter wave plate retarder disposed between at least one of said microdisplay panels and said polarizing beam splitter (PBS).

7. The optical engine of claim 1 wherein:
   said color wheel further drives two composite lights comprising a yellow light and a magenta light.

8. The optical engine of claim 1 wherein:
   said dichroic device separating said composite lights into a red path and a green-or-blue path.

9. The optical engine of claim 1 wherein:
   said optical retarder to modify a polarization state for one of said first and second color paths further comprising a half-wave optical retarder for changing a polarization by ninety degrees.

10. The optical engine of claim 1 further comprising:
    a linear polarizer disposed right after said optical retarder in one of said first and second color paths.

11. A method for configuring an optical engine comprising:
    driving at least two separate composite lights by employing a color wheel for driving a yellow light and a magenta light;
    sequentially separating said at least two composite lights into a first color path and a second color path with;
    employing an optical retarder to modify a polarization state for one of said first and second color paths; and
    receiving a first and a second beams of light projected from said first and second light path respectively to reconstitute a combined beam of light comprising two different colors with mutually orthogonal polarization states.

12. The method of claim 11 further comprising:
    employing a polarizing beam splitter (PBS) for receiving and splitting said combined beam according to a polarization state for projecting to two microdisplay panels.

13. The method of claim 12 further comprising:
    receive and projecting a beam of light from said polarizing beamsplitter (PBS).

14. The method of claim 13 further comprising:
    disposing a linear polarizer between said polarization beam splitter and a projection lens for preventing a transmission of a selected beam of specific color and specific polarization.

15. The method of claim 13 further comprising:
    disposing a linear polarizer disposed between said polarization beam splitter and a projection lens for preventing a transmission of a red color beam of a p-polarization.

16. The method of claim 11 wherein:
    said step of separating said composite lights further comprising a step of employing a dichroic device for separating said composite lights into a red path and a green-or-blue path.

17. The method of claim 11 wherein:
    said step of employing said optical retarder to modify a polarization state for one of said first and second color paths further comprising a step of employing a half-wave optical retarder for changing a polarization by ninety degrees.

18. The method of claim 11 further comprising:
    disposing a linear polarizer right after said optical retarder in one of said first and second color paths.

19. The method of claim 11 further comprising:
    disposing a quarter wave plate retarder between at least one of said microdisplay panels and said polarizing beam splitter (PBS).

* * * * *